(12) United States Patent
Do et al.

(10) Patent No.: US 9,817,112 B2
(45) Date of Patent: Nov. 14, 2017

(54) PAIRWISE MEASUREMENTS FOR IMPROVED POSITION DETERMINATION

(71) Applicant: QUALCOMM Incorporated, San Diego, CA (US)

(72) Inventors: Ju-yong Do, Cupertino, CA (US); Sai Pradeep Venkatraman, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/967,132

(22) Filed: Dec. 11, 2015

(65) Prior Publication Data
US 2016/0097850 A1 Apr. 7, 2016

Related U.S. Application Data

(62) Division of application No. 13/725,078, filed on Dec. 21, 2012, now Pat. No. 9,213,093.

(51) Int. Cl.
*H04W 24/00* (2009.01)
*G01S 13/76* (2006.01)
*G01S 5/02* (2010.01)

(52) U.S. Cl.
CPC ............ *G01S 13/765* (2013.01); *G01S 5/021* (2013.01)

(58) Field of Classification Search
CPC ..... H04W 64/00; H04W 24/00; H04W 28/04; G01S 5/0205; G01S 5/10; G01S 5/14;
(Continued)

(56) References Cited

U.S. PATENT DOCUMENTS 7,773,515 B2 8/2010 Jain et al.
8,165,599 B1 4/2012 Dronamraju et al.
(Continued)

FOREIGN PATENT DOCUMENTS

WO 2010059934 A2 5/2010
WO 2011149496 A1 12/2011

OTHER PUBLICATIONS

IEEE: "IEEE standard for information technology—Telecommunications and information exchange between systems—Local and metropolitan area networks—Specific requirements", Aug. 31, 2007, Aug. 31, 2007 (Aug. 31, 2007), pp. 1-202, XP002587647, ISBN: 978-0-7381-5583-8.
(Continued)

*Primary Examiner* — Liton Miah
(74) *Attorney, Agent, or Firm* — Muncy, Geissler, Olds & Lowe, P.C.

(57) ABSTRACT

Approaches for enhancing range-based position determination using pairwise error detection and compensation are provided. One method for enhancing a position estimate of a first node may include performing measurements at the first node using a signal received from a second node, and receiving measurements from the second node. The received measurements may be performed at the second node using a signal provided by the first node. The method may further include determining pairwise comparisons of the performed measurements and the received measurements, and compensating the measurements performed at the first node, based on the pairwise comparisons, for estimating the position of the first node. Systems and apparatuses for performing the various position determination methods are further presented.

28 Claims, 9 Drawing Sheets

(58) Field of Classification Search
CPC ...... H04J 3/0667; H04L 1/20; H04L 43/0829; H04L 43/0858
See application file for complete search history.

(56) References Cited

U.S. PATENT DOCUMENTS

| | | |
|---|---|---|
| 8,552,903 B2 | 10/2013 | Julian et al. |
| 2009/0073031 A1 | 3/2009 | Kim |
| 2009/0147806 A1 | 6/2009 | Brueckheimer |
| 2009/0196189 A1 | 8/2009 | Ostrup et al. |
| 2010/0046388 A1 | 2/2010 | Kim et al. |
| 2010/0135178 A1 | 6/2010 | Aggarwal et al. |
| 2010/0178934 A1 | 7/2010 | Moeglein et al. |
| 2010/0271263 A1 | 10/2010 | Moshfeghi |
| 2012/0050108 A1* | 3/2012 | Whiting ................ G01S 5/0252 342/452 |
| 2014/0179340 A1 | 6/2014 | Do et al. |

OTHER PUBLICATIONS

International Preliminary Report on Patentability—PCT/US2013/076922, The International Bureau of WIPO—Geneva, Switzerland, Mar. 30, 2015.
International Search Report and Written Opinion—PCT/US2013/076922—ISA/EPO—Jun. 25, 2014.

* cited by examiner

Mobile to APs

AP to AP

Mobile to Mobile

PAIRWISE MEASUREMENTS FOR IMPROVED POSITION DETERMINATION

CLAIM OF PRIORITY UNDER 35 U.S.C. §120

The present application for patent is a divisional of patent application Ser. No. 13/725,078, entitled "Pairwise Measurements for Improved Position Determination", filed Dec. 21, 2012, pending, and assigned to the assignee hereof and hereby expressly incorporated by reference herein.

FIELD OF DISCLOSURE

Aspects of this disclosure generally relate to position determination techniques in wireless communication systems. Specifically, the disclosure provides approaches for improving range-based position determination using pairwise error detection and compensation.

BACKGROUND

Mobile stations offer sophisticated capabilities for determining their position using a variety of resources, including those resources provided by wireless communication networks. New software applications residing on mobile stations, such as those related to personal productivity, social networking, advertising, e-commerce, and/or other forms of data acquisition, may utilize position information to provide new features and services to consumers. Moreover, some regulatory requirements of various jurisdictions may require a network operator to report the location of a mobile station for emergency services.

In conventional digital cellular networks, position location capability can be provided by various time and/or phase measurement techniques. For example, in CDMA networks, one position determination approach used is Advanced Forward Link Trilateration (AFLT). Using AFLT, a mobile station may compute its position from phase measurements of pilot signals transmitted from a plurality of base stations. Improvements to AFLT have been realized by utilizing hybrid position location techniques, where the mobile station may employ a Satellite Positioning System (SPS) receiver. The SPS receiver may provide position information independent of the information derived from the signals transmitted by the base stations. Moreover, position accuracy can be improved by combining measurements derived from both SPS and AFLT systems using conventional techniques.

However, conventional position location techniques based upon signals provided by SPS and/or cellular base stations may encounter difficulties when the mobile station is operating within a building and/or within urban environments. In such situations, signal reflection and refraction, multipath, and/or signal attenuation can significantly reduce position accuracy, and can slow the "time-to-fix" to unacceptably long time periods. These shortcomings may be overcome by having the mobile station exploit signals from other types of wireless networks, such as Wi-Fi (e.g., IEEE 802.11x standards) or WiMAX (e.g., IEEE 802.16 standards), to derive position information. Conventional position determination techniques used in these other types of wireless networks may utilize range-based position determination techniques. The range-based position determination techniques may estimate distance information using Round Trip Time (RTT) measurements and/or signal strength measurements (e.g., Received Signal Strength Indicator (RSSI)) derived from signals utilized within such networks. The range based position determination may be used for any network device within these networks, such mobile stations and/or access points (APs) which are placed at unknown positions. However, indoor environments can present challenges for reliable range measurements due to the complexity of the radio frequency (RF) environment and multipath.

Moreover, the network devices themselves may introduce various biases that can affect range determination. For example, RTT measurement techniques may be affected by time biases introduced by time delays incurred as wireless signals propagate through various devices in the network. Utilizing RSSI measurements for accurate ranging may be affected by amplitude biases introduced by transmission power differences and/or various gains used in RF and signal processing paths of network devices. In practice, when employing conventional range-based positioning techniques, estimating and removing time and amplitude biases may involve time-consuming pre-deployment fingerprinting and/or calibration of the network devices.

Accordingly, it may be desirable to implement efficient compensation techniques which can address time and amplitude biases to improve range-based position determination, while avoiding costly pre-deployment efforts and/or changes to the network infrastructure.

SUMMARY

Aspects of the invention are directed to systems and method for improving range-based position determination using pairwise error detection and compensation.

In one aspect, a method for enhancing a position estimate of a first node is presented. The method may include performing measurements at the first node using a signal received from a second node, and then receiving measurements from the second node, where the received measurements are performed at the second node using a signal provided by the first node. The method may further include determining pairwise comparisons of the performed measurements and the received measurements, and then compensating the measurements performed at the first node, based on the pairwise comparisons, for estimating the position of the first node.

In another aspect, a first node which determines an enhanced position estimate using pairwise measurements is presented. The first node may include a wireless transceiver, a processor coupled to the wireless transceiver, and a memory coupled to the processor. The memory may store executable instructions and data for causing the processor to perform measurements at the first node using a signal received from a second node, and then receive measurements from the second node, wherein the received measurements are performed at the second node using a signal provided by the first node. The instructions may further configure the processor to determine pairwise comparisons of the performed measurements and the received measurements, and compensate the measurements performed at the first node, based on the pairwise comparisons, for estimating the position of the first node.

In a further aspect, another method for enhancing a position estimate of a first node is presented. The method may include receiving Round Trip Time (RTT) and Received Signal Strength Indicator (RSSI) measurements from a plurality of neighboring nodes, wherein the RTT and RSSI measurements are performed at the neighboring nodes using a signal provided by the first node. The method may further include evaluating the quality of the RTT and RSSI measurements received from the neighboring nodes, and performing pairwise comparison and compensation with each neighboring node associated with the RTT and/or RSSI measurements which fail the evaluating. The method may further include determining a position estimate of the first node based on the RTT measurements and RSSI measurements which pass the evaluating. The method may further include comparing information based on the RTT measurements and/or the RSSI measurements with information derived from the determined position estimate, and performing pairwise comparison and compensation with each neighboring node associated with RTT measurements and/or RSSI measurements which compare unfavorably.

In another aspect, a first node which triggers an enhanced position estimate using pairwise measurements is presented. The first node may include a wireless transceiver, a processor coupled to the wireless transceiver, and a memory coupled to the processor. The memory stores executable instructions and data for causing the processor to receive Round Trip Time (RTT) and Received Signal Strength Indicator (RSSI) measurements from a plurality of neighboring nodes. The RTT and RSSI measurements may be performed at the neighboring nodes using a signal provided by the first node. The instructions may further cause the processor to evaluate the quality of the RTT and RSSI measurements received from the neighboring nodes, and perform pairwise comparison and compensation with each neighboring node associated with the RTT and/or RSSI measurements which fail the evaluating. The instructions may further cause the processor to determine a position estimate of the first node based on the RTT measurements and RSSI measurements which pass the evaluating. The instructions may further cause the processor to compare information based on the RTT measurements and/or the RSSI measurements with information derived from the determined position estimate, and perform pairwise comparison and compensation with each neighboring node associated with RTT measurements and/or RSSI measurements which compare unfavorably.

In yet another aspect, a method for enhancing a position determination performed by a server is presented. The method may include receiving measurements from a node based on signals received from a plurality of neighboring nodes, and receiving signal measurements from a plurality of neighboring nodes based on signals received from the node. The method may further include determining a pairwise comparison of the measurements from the node and the measurements from each neighboring node. The method may further include compensating the measurements received from the node based on the pairwise comparisons, and determining the position estimate of the node using the compensated measurements.

In another aspect, a server which enhances a position determination of a node using pairwise measurements is presented. The server may include a network interface, a processor coupled to the network interface, and a memory coupled to the processor. The memory may store executable instructions and data for causing the processor to receive measurements from a node based on signals received from a plurality of neighboring nodes, and receive signal measurements from a plurality of neighboring nodes based on signals received from the node. The instructions may further cause the processor to determine a pairwise comparison of the measurements from the node and the measurements from each neighboring node, compensate the measurements received from the node based on the pairwise comparisons, and determine the position estimate of the node using the compensated measurements.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Figure 1:
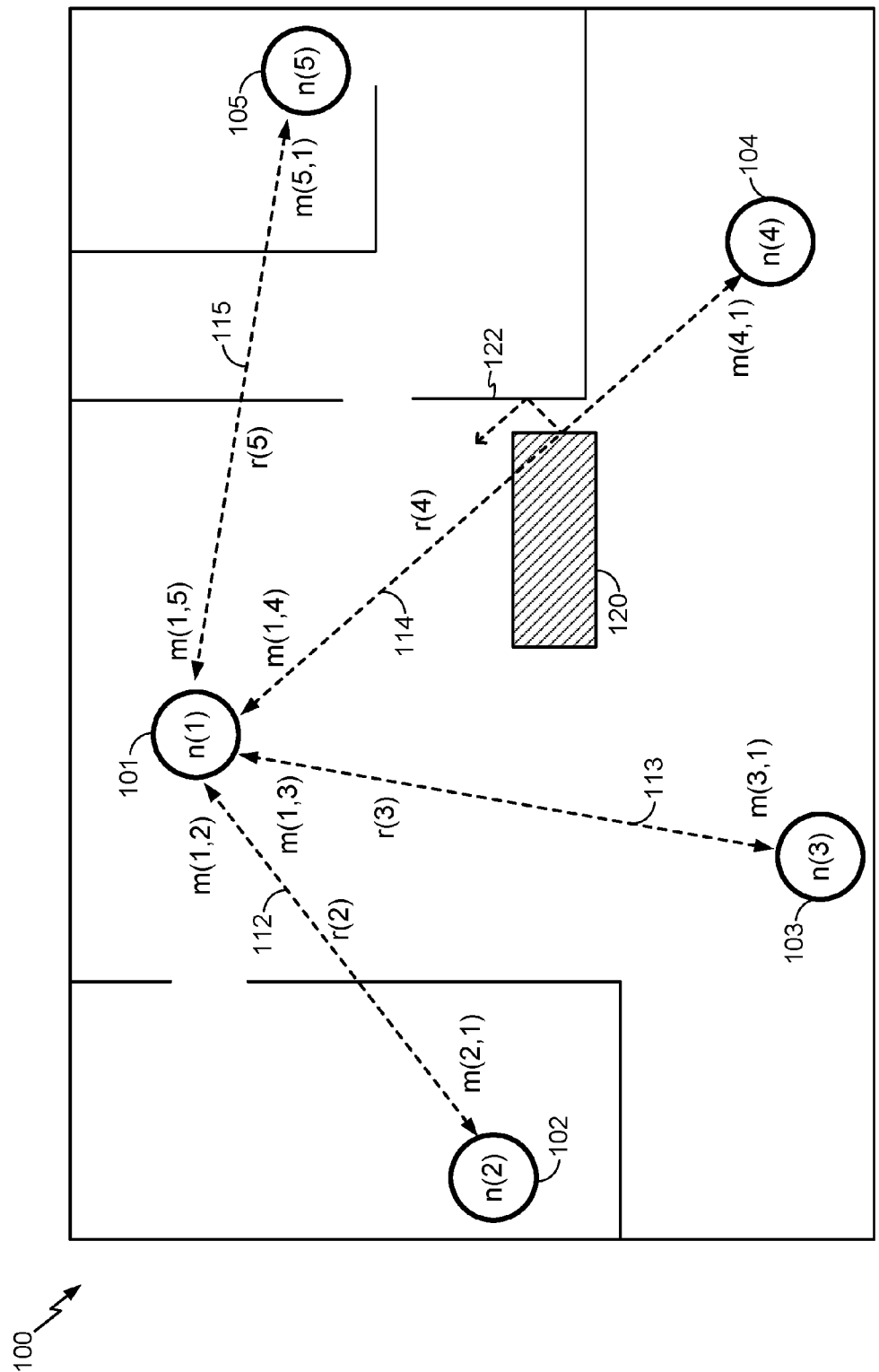
FIG. 1 is a diagram introducing the concepts of pairwise comparison and compensation (PCC) within an exemplary indoor wireless networking environment.

FIG. 1 is a diagram introducing the concepts of Pairwise Comparison and Compensation (PCC) used in a wireless network that is placed in an indoor environment 100. The environment may include any number of wireless devices 101-105 which may transmit and receive wireless signals for exchanging information in a wireless local area network. The wireless devices 101-105 are referred to herein as "nodes," (e.g., n(1) though n(5) as shown in FIG. 1), and each node may be, for example, an access point (AP) or a mobile station (MS). The nodes n(1) 101 through n(5) 105 can communicate with each other over wireless channels 112-115 using any known wireless protocol (e.g., 802.11) or combinations thereof.

In addition to exchanging information over the wireless channels 112-115, one or more nodes n(1) 101 through n(5) 105 may estimate their position using measurements derived from signals received from neighboring nodes. Such measurements may use known techniques for exploiting the physical properties of the received signals to estimate distances (defined herein as "ranges") between a node and its neighboring nodes. Once these ranges are known, further processing (which may also utilize pre-established information regarding the layout of the network) can estimate a position of a node using known range-based position determination techniques. The ranges may be estimated by exploiting different physical characteristics of the received signal, and can include utilizing amplitude, propagation time, and/or phase information of the signals exchanged between nodes. For example, ranges may be derived from Round Trip Time (RTT) measurements. Ranges may also be derived from Received Signal Strength Indicator (RSSI) measurements of the signals received at a node for which a location is desired. Embodiments may also utilize combinations of RSSI and RTT approaches. Alternative aspects may utilize any other known ranging techniques or combinations thereof. Examples of known time-based ranging techniques may include Time of Arrival (TOA), Time Difference of Arrival (TDOA), Observed Time Difference of Arrival (OTDOA), and/or Advanced Forward Link Trilateration (AFLT). Examples of known power/amplitude ranging techniques may utilize Signal-to-Noise Ratio (SNR), Carrier-to-Noise Ratio (CNR), and/or Signal-to-Interference and Noise Ratio (SINR).

For example, as shown in FIG. 1, node n(1) 101 may determine ranges r(2:5) by communicating wirelessly with neighboring nodes n(2:5) 102-105 using RF signals (e.g., 2.4 GHz), and standardized protocols for the modulation of the RF signals and the exchanging of information packets (e.g., IEEE 802.11). (Note: as used herein below, array notation x(m:n) is an abbreviated way of representing the set of values {x(m), x(m+1), x(m+2), . . . , x(n−2), x(n−1), x(n)}, where m<n.) Once the ranges r(2:5) are determined using RSSI and/or RTT measurements, node n(1) 101 can then solve for its position by using a variety of known positioning techniques, such as, for example, trilateration, sequential least squares, multi-dimensional scaling, and/or particle filtering (PF). From a geometric perspective, it can be seen that the position node n(1) 101 ideally lies at the intersection of circles having radii defined by the ranges r(2:5) with centers at the locations of neighboring nodes(2:5) 102-105. In practice, the intersection of these circles may not lie at a single point due to the noise and other uncertainties/errors in the networking system.

Further referring to FIG. 1, the indoor environment 100 may present challenges for deriving the ranges r(2:5) because obscurations can cause signal interference that creates multipath and/or attenuates the received signals, which can adversely affect both RTT and RSSI measurements. As can be seen in FIG. 1, node n(2) 102 and node n(5) 105 are enclosed in different rooms, thus signals exchanged between these nodes and node n(1) 101 will experience some attenuation when passing through one or more walls. Node n(3) 103 has clear line of sight to node n(1) 101, and thus range measurements derived from signals exchanged over wireless channel 113 will likely be more accurate and consistent than those measurements derived from signals exchanged over wireless channel 112 and wireless channel 115. In each of the above noted cases, signal exchanges over wireless channels 112, 113, and 115 will be more or less symmetric. That is, the signals transmitted from node n(1) 101 and received by node (2) 102, node (3) 103, node (5) 105 will undergo similar effects as signals transmitted in the reverse direction, since the wireless channels 112, 113 and 115 are effectively symmetric. However, signals exchanged between node n(1) 101 and node n(4) 104 may not undergo the same degradations in both directions, as wireless channel 114 is not "as symmetric" as wireless channels 112, 113, and 115, due to the relative location of an object 120 and wall 122, as will be explained as follows.

Signals received at node n(4) 104 over wireless channel 114, which are transmitted by node n(1) 101, may only experience attenuation by object 120. Signals reflected off (not shown) object 120 transmitted by node n(1) 101, will not be received by node (4) 104. However, signals transmitted by node n(4) 104 and received by node n(1) 101 may experience multipath due to reflections between object 120 and wall 122, in addition to being attenuated by object 120. Because signals experience different types of interference depending upon the direction of travel in wireless channel 114, measurements to derive range may be adversely affected between the node pair of node n(1) 101 and node n(4) 104, and thus position determination accuracy can be reduced. Wireless channels having characteristics which vary based on the direction of signal propagation are referred to herein as "asymmetric wireless channels." Techniques for addressing the adverse effects of asymmetric wireless channels on position determination are provided herein and are referred to as "Pairwise Comparison and Compensation (PCC)."

A top level description of PCC immediately follows, with more detailed explanations being presented below in the following description and subsequent FIGS. 2-10. PCC can address adverse effects of asymmetric wireless channels, and can address ranging errors introduced by temporal channel variation, and/or device measurement errors such as the Turnaround Clock Factor (TCF) error in RTT measurements. As used herein, the TCF may be defined as the residual of the RTT measurement minus the sum of forward and reverse time of flight. In other words, the TCF is any additional time delay caused by the responding device, which is the amount of time between the responding device's reception of signal and its subsequent transmission of the response signal back to the originating device.

PCC may initially start out by taking one or more pairwise measurements between a node of interest (hereinafter the "node") and one or more neighboring nodes. The pairwise measurements may include RSSI and/or RTT, and typically include data from both sides of the wireless channel, to be collected at the node for subsequent comparison and compensation. Once the pairwise measurements are collected, they may be compared to detect and reject outlier measurements, and/or to generate correction factors. The correction factors may be applied to the measurements prior to determining range, thus producing better range estimates and subsequently improved position estimates. In one example, the comparison operation may simply take the form of subtracting the pairwise measurements to generate a bias value, where the bias value is then applied to correct the measurement for range determination.

For example, further referring to FIG. 1, the PCC process may start by making pairwise measurements between node n(1) 101 and neighboring node n(2) 102. This may be accomplished by having node n(1) 101 transmit a signal to node n(2) 102 requesting a measurement m(2,1) to be made at node n(2) 102. The requested measurement m(2,1) at node n(2) 102 is made based on the signal transmitted by node n(1) 101. Once the measurement m(2,1) is complete, it may be sent back to node n(1) 101 over the wireless channel 112. Node n(1) 101 may then generate measurement m(1,2) based on the signal transmitted by node n(2) 102 over wireless channel 112. The resulting pair of measurements {m(1,2), m(2,1)} is a single pairwise measurement over wireless channel 112. This process may be repeated a number of times over the same wireless channel 112 (e.g., 5-10 times) to create adequate sample statistics. The same pairwise collection process may be repeated between node n(1) 101 and the other neighboring nodes n(3:5) 103-105 to collect pairwise measurements for the other wireless channels 113-115. Once a sufficient number of pairwise measurements have been collected for each wireless channel, the measurements may be compared to remove outliers, and subsequently processed to generate bias values for compensating (i.e., adjusting) the measurements m(1,2:5) made by node n(1) 101 to improve the range estimates for ranges r(2:5). Upon determining compensated range estimates for ranges r(2:5), a more accurate position estimate of node n(1) 101 may be determined.

As noted above, the pairwise measurements may be RSSI and/or RTT measurements taken at opposite ends of a wireless channel for a given node pair. The pairwise comparison can be effective for detecting persistent range measurement errors originated from device itself. In case of RTT, certain APs may have outstanding TCF (turnaround clock factors) compared to its peers, which cannot be detected by itself, but may be detectable through pairwise comparison.

Accordingly, the two-sided data collection, comparison, and compensation approach described above can provide: 1) error detection and outlier exclusion of measurements used to determine range; 2) compensation/adjustment of measurements to improve accuracy of range estimation, and subsequently improved position determination; and 3) permit calibration values of nodes which have been pre-calibrated (such as APs) to be "propagated" to other uncalibrated nodes so that their calibration of these nodes may be performed "on the fly."

The above description merely provides an example scenario for illustrating the concepts of PCC techniques for enhancing range-based position determination. It should be understood that PCC techniques could be used with any number of network nodes using any known wireless networking protocols, including local area networking (IEEE 801.11) and/or wide area networking protocols (e.g., 3GPP2, LTE, WiMAX, etc.). Moreover, the PCC techniques are not necessarily limited to indoor environments, and thus may also be used in outdoor environments.

Figure 2:
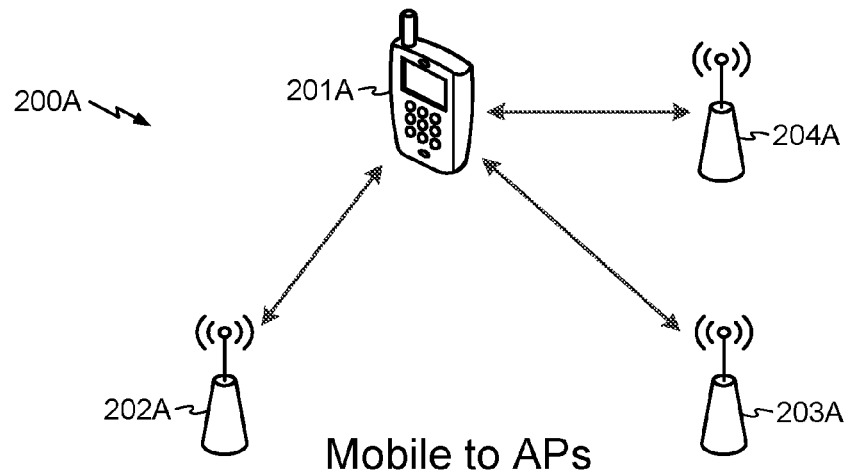
FIG. 2 depicts diagrams illustrating exemplary configurations of various types of nodes in a wireless network.
Figure 2:
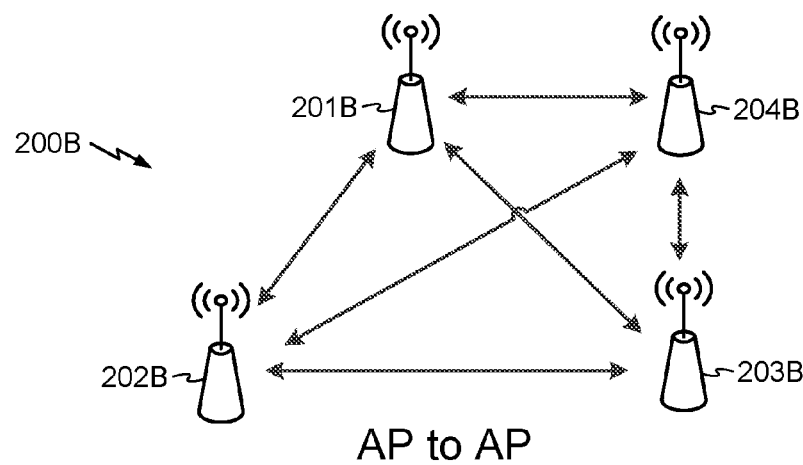
Figure 2:
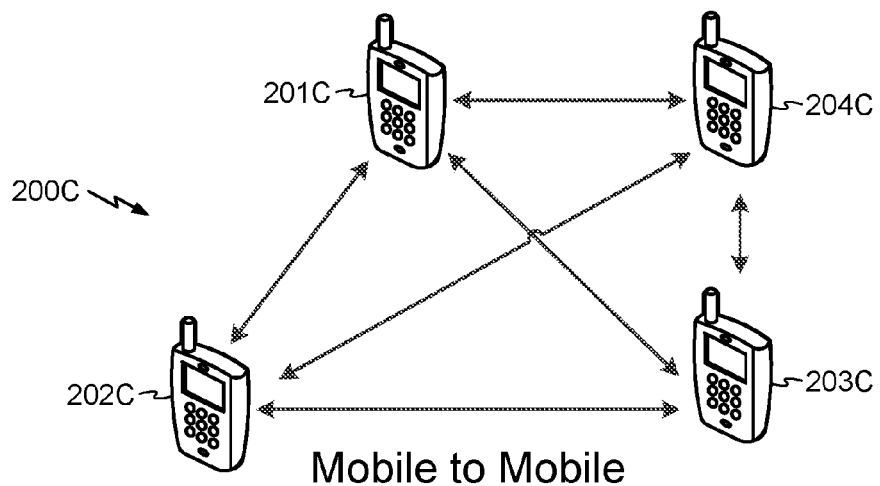

FIG. 2 depicts diagrams illustrating exemplary configurations of nodes in a wireless network. As noted above, each node within a network may benefit from Pairwise Comparison and Compensation (PCC) to improve position determination. Each node in the network may be any type of wireless device, which could include one or more mobile stations (MSs) and/or one or more access points (APs) in any type of configuration. For example, configuration 200A depicts an MS 201A acting as a node of interest, with neighboring nodes being APs 202A, 203A, and 204A. In this configuration, MS 201A may form pairs with APs 202A, 203A, and 204A for performing PCC. Alternatively, any node in configuration 200A may initiate and collect pairwise measurements in configuration 200A.

Configuration 200B shows APs 201B-204B acting as nodes in the network. Since the APs may wirelessly communicate with each other, any AP may initiate the PCC process with its neighboring APs to better establish its position. This type of network configuration may also be called a peer-to-peer configuration. In other embodiments, the PCC process may be used to propagate calibration information from APs which have been calibrated, to other APs which have not been calibrated, or to APs which may wish to have their calibration information updated. Propagating the calibration information is discussed in more detail below in the description of FIG. 8.

Further referring to FIG. 2, in another exemplary configuration 200C, each node within the network may be an mobile station (MS). The MSs 201C-204C may communicate with each other over their respective wireless channels in a "peer-to-peer" scenario, and any pair can initiate PCC to improve its position determination accuracy.

In each of the above embodiments, the PCC process can be performed on a node of interest (also referred to herein as "the node") which communicates with its neighboring nodes to generate and collect the appropriate pairwise measurements. However, in other embodiments, PCC operations may be performed by a server (hereinafter referred to as a "positioning server") which can receive the pairwise measurements and perform the comparisons, and generate compensation values (e.g., biases) for use in compensation. The positioning server may then update the various nodes in the network with the appropriate values so their measurements may be compensated to improve range calculations and thus subsequent position determination.

Figure 3:
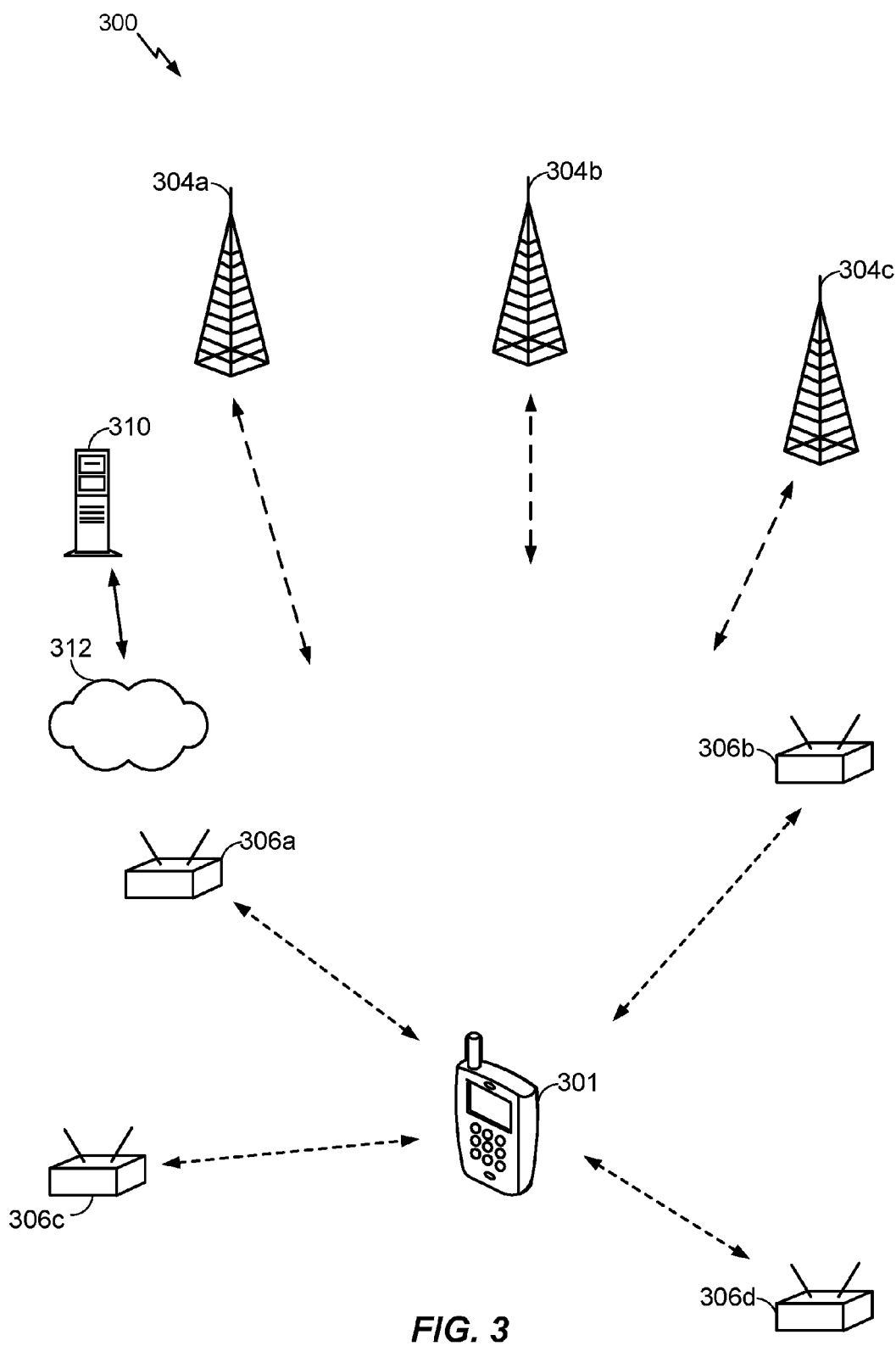
FIG. 3 is a diagram of an exemplary large scale operating environment for a mobile station which may communicate with local area wireless networks and wide area wireless networks.

FIG. 3 is a diagram of an exemplary large scale operating environment 300 for a mobile station 301 which may perform Pairwise Comparison and Calibration (PCC) with local area wireless networks and/or wide area wireless networks. The operating environment 300 may contain one or more different types of wireless communication systems and/or wireless positioning systems as described in detail below. The mobile station 301 may include one or more dedicated Satellite Positioning System (SPS) receivers specifically designed to receive signals for deriving geo-location information from the SPS satellites (e.g., GPS). However, it may be assumed that the signal quality from the SPS satellites is not sufficient for accurate position determination. This may occur in indoor environments where signals from SPS satellites may be attenuated and/or experience multipath interference. Such conditions may also be experienced outdoors in dense urban areas. Accordingly, accurate position determination may utilize, or at least include in addition to information produced by an SPS, signals provided by one or more wireless communication networks.

The operating environment 300 may also include a plurality of one or more types of Wide Area Network Wireless Access Points (WAN-WAPs) 304a-304c, which may be used for wireless voice and/or data communication, and as another source of independent position information for mobile station 301. The WAN-WAPs 304a-304c may be part of a wireless wide area network (WWAN), which may include cellular base stations at known locations, and/or other wireless wide area systems, such as, for example, WiMAX (e.g., 802.16). The WWAN may include other known network components which are not shown in FIG. 3 for simplicity. Typically, each WAN-WAP 304a-304c within the WWAN may operate from fixed positions, and may provide network coverage over large metropolitan and/or regional areas.

The operating environment 300 may further include Local Area Network Wireless Access Points (LAN-WAPs) 306a-306d, may be used for wireless voice and/or data communication, as well as another independent source of position data. The LAN-WAPs 306a-306d can be part of a Wireless Local Area Network (WLAN), which may operate in buildings and perform communications over smaller geographic regions than a WWAN. Such LAN-WAPs 306a-306d may be part of, for example, WiFi networks (802.11x), cellular piconets and/or femtocells, Bluetooth Networks, UWB beacon, Near Field Communication (NFC) devices, etc.

The mobile station 301 may derive position information and enhance position determination using Pairwise Comparison and Compensation (PCC) with any one or a combination of the WAN-WAPs 304a-304c, and/or the LAN-WAPs 306a-306d. Each of the aforementioned systems can provide an independent estimate of the position for mobile station 301 using different techniques as noted above. In some embodiments, the mobile station 301 may combine the solutions derived from each of the different types of access points to improve the accuracy of the position data and the PCC process.

When deriving position from the WWAN, each WAN-WAP 304a-304c may take the form of base stations within a digital cellular network, and the mobile station 301 may include a cellular transceiver and processor that can exploit the base station signals to derive position. It should be understood that digital cellular network may include additional base stations or other resources not shown in FIG. 3. While WAN-WAPs 304a-304c may actually be moveable or otherwise capable of being relocated, for illustration purposes it will be assumed that they are essentially arranged in a fixed position. When using cellular networks, the mobile station 301 may perform position determination using the aforementioned time-of-arrival techniques such as, for example, RTT based measurements, Advanced Forward Link Trilateration (AFLT), etc. Position determination may also be performed based on signal amplitude measurements (e.g., RSSI measurements). Moreover, positioning determination may be enhanced using the PCC techniques described herein.

In other embodiments, each WAN-WAP 304a-304c may take the form of WiMax wireless networking base station. In this case, the mobile station 301 may determine its position using time-of-arrival (TOA) techniques, including RTT based measurements, from signals provided by the WAN-WAPs 304a-304c, and/or exploiting amplitude information of signals (e.g., RSSI-based measurements).

The mobile station 301 may determine positions either in a standalone mode, or by using the assistance of a positioning server 310 and network 312, as will be described in more detail below. Moreover, positioning server 310 may be able to receive pairwise measurements from the mobile station 301, and perform PCC to determine compensation values (e.g., bias). The compensation values may be transmitted back to the mobile station 301 for use in compensating measurements (e.g., RSSI and/or RTT) to improve range estimates. Note that embodiments of the disclosure include having the mobile station 301 determine position information using WAN-WAPs 304a-304c which are different types. For example, some WAN-WAPs 304a-304c may be cellular base stations, and other WAN-WAPs may be WiMax base stations. In such an operating environment, the mobile station 301 may be able to exploit the signals from each different type of WAN-WAP, and further combine the derived position solutions to improve accuracy.

When deriving position and/or performing the PCC process using the WLAN, the mobile station 301 may utilize position determination and/or PCC techniques with the assistance of the positioning server 310 and the network 312. The positioning server 310 may communicate to the mobile station 301 through network 312. Network 312 may include a combination of wired and wireless networks which incorporate the LAN-WAPs 306a-306d. In one embodiment, each LAN-WAP 306a-306d may be, for example, a WiFi wireless access point, which is not necessarily set in a fixed position and can change location. The position of each LAN-WAP 306a-306d may be stored in the positioning server 310 in a common coordinate system, or within the LAN-WAP itself. In one embodiment, the position of the mobile station 301 may be determined by having the mobile station 301 receive signals from each LAN-WAP 306a-306d. Each signal may be associated with its originating LAN-WAP based upon some form of identifying information that may be included in the received signal (such as, for example, a MAC address). The mobile station 301 may then derive the time delays (e.g., RTT) and/or amplitude information (e.g. RSSI) associated with each of the received signals. The mobile station 301 may then form a message which can include the time delays and the identifying information of each of the LAN-WAPs 306a-306d, and send the message via network 312 to the positioning server 310. Based upon the received message, the positioning server 310 may then determine a position, using the stored locations of the relevant LAN-WAPs 306a-306d, of the mobile station 301. The positioning server 310 may generate and provide a Location Configuration Information (LCI) message to the base station that includes a pointer to the mobile station's position in a local coordinate system. The LCI message may also include other points of interest in relation to the location of the mobile station 301. When computing the position of the mobile station 301, the positioning server 310 may take into account the different delays which can be introduced by elements within the wireless network. The positioning server 310 may further receive pairwise measurements (e.g., RSSI and/or RTT) from each LAN-WAP 306a-306d and the mobile station 301, and perform pairwise comparison on the measurements to detect and discard outliers. For the remaining measurements, the positioning server 310 may determine compensation values (e.g., RTT and/or RSSI bias values) for making adjustments to the measurements, and provide these values to the mobile station 301 to improve the mobile station's ranging determination and range-based positioning. In other embodiments, the positioning server 310 may provide the received pairwise measurements from another node in the network, such as any LAN-WAP 306a-306d (or WAN-WAP 304a-304c) and perform PCC to provide compensation values (e.g., RTT and/or RSSI bias values) for improving range determination and range-based positioning.

The position determination techniques described herein may be used for various wireless communication networks such as a wide area wireless network (WWAN), a wireless local area network (WLAN), a wireless personal area network (WPAN), and so on. The term "network" and "system" may be used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16) and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of WWAN, WLAN and/or WPAN.

Figure 4:
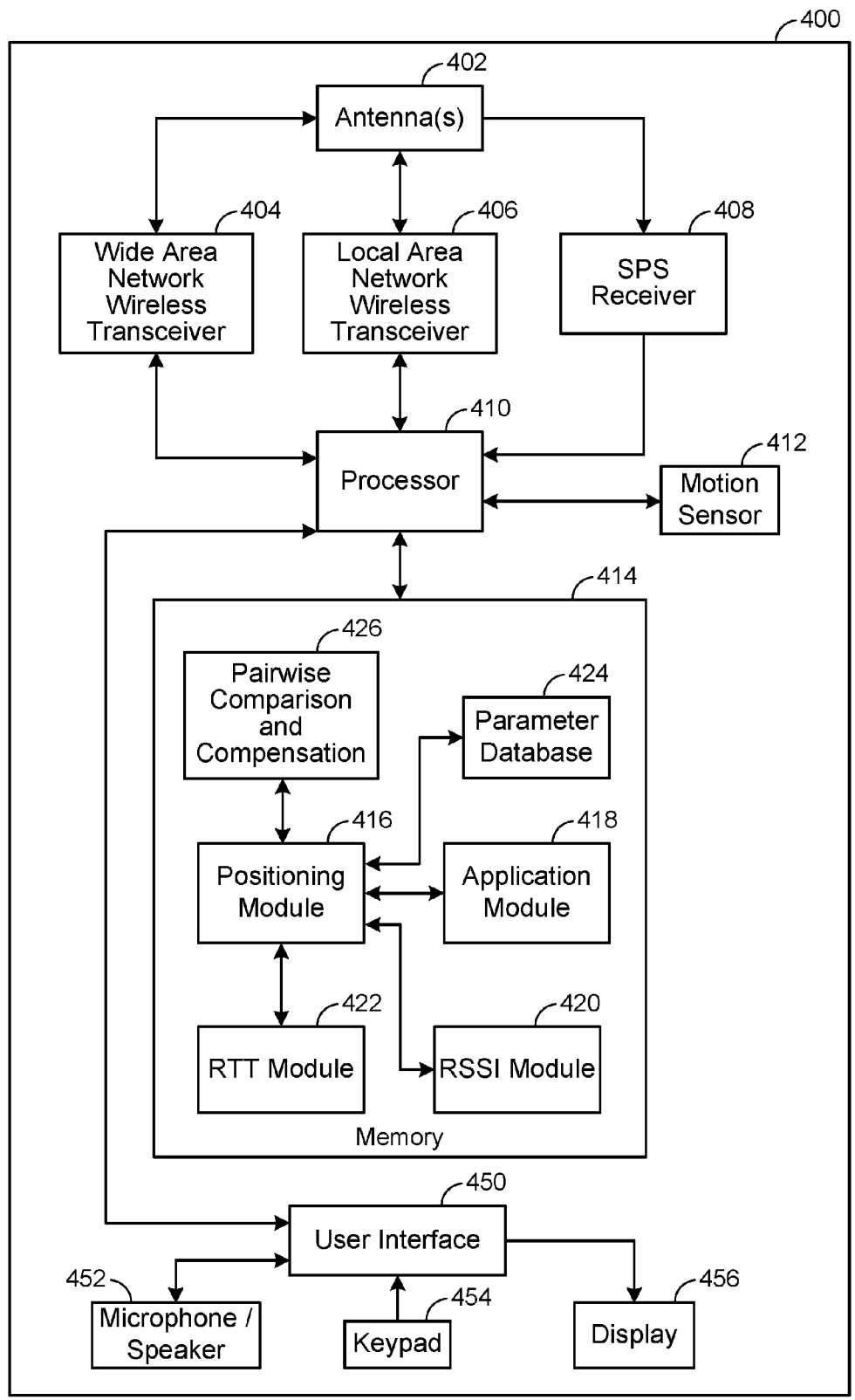
FIG. 4 is a block diagram illustrating various components of an exemplary mobile station.

FIG. 4 is a block diagram illustrating various components of an exemplary mobile station 400. For the sake of simplicity, the various features and functions illustrated in the box diagram of FIG. 4 are connected together using a common bus which is meant to represent that these various features and functions are operatively coupled together. Those skilled in the art will recognize that other connections, mechanisms, features, functions, or the like, may be provided and adapted as necessary to operatively couple and configure an actual portable wireless device. Further, it is also recognized that one or more of the features or functions illustrated in the example of FIG. 4 may be further subdivided, or two or more of the features or functions illustrated in FIG. 4 may be combined.

The mobile station 400 may include one or more wide area network wireless transceiver(s) 404 that may be connected to one or more antennas 402. The wide area network wireless transceiver 404 comprises suitable devices, hardware, and/or software for communicating with and/or detecting signals to/from WAN-WAPs 304a-304c, and/or directly with other wireless devices within a network. In one aspect, the wide area network wireless transceiver 404 may comprise a CDMA and/or LTE communication system suitable for communicating with a CDMA and/or LTE network of wireless base stations; however in other aspects, the wireless communication system may comprise another type of cellular telephony network, such as, for example, TDMA or GSM. Additionally, any other type of wireless networking technologies may be used, for example, WiMax (802.16), etc. The mobile station 400 may also include one or more local area network wireless transceivers 406 that may be connected to one or more antennas 402. The local area network wireless transceiver 406 comprises suitable devices, hardware, and/or software for communicating with and/or detecting signals to/from LAN-WAPs 306a-306d, and/or directly with other wireless devices within a network. In one aspect, the local area network wireless transceiver 406 may comprise a WiFi (802.11x) communication system suitable for communicating with one or more wireless access points; however in other aspects, the local area network wireless transceiver 406 may comprise any another type of local area network and/or personal area network, (e.g., Bluetooth). Additionally, other types of wireless networking technologies may be used, such as, for example, Ultra Wide Band, ZigBee, wireless USB etc.

As used herein, the abbreviated term "access point" (AP) may be used to refer to LAN-WAPs 306a-306d and/or WAN-WAPs 304a-304c. Specifically, in the description presented below, when the term "AP" is used, it should be understood that embodiments may include a mobile station 400 that can exploit signals from a plurality of LAN-WAPs 306a-306d, a plurality of WAN-WAPs 304a-304c, or any combination of the two. The specific type of AP being utilized by the mobile station 400 may depend upon the environment of operation. Moreover, the mobile station 400 may dynamically select between the various types of APs in order to arrive at an accurate position solution and/or Pairwise Comparison and Compensation.

An SPS receiver 408 may also be included in mobile station 400. The SPS receiver 408 may be connected to the one or more antennas 402 for receiving satellite signals. The SPS receiver 408 may comprise any suitable hardware and/or software for receiving and processing SPS signals. The SPS receiver 408 may request information from the other systems, and perform the calculations necessary to determine the mobile station's 400 position using measurements obtained by any suitable algorithm which exploits SPS signals.

A motion sensor 412 may be coupled to a processor 410 to provide relative movement and/or orientation information which is independent of motion data derived from signals received by the wide area network wireless transceiver 404, the local area network wireless transceiver 406, and the SPS receiver 408. By way of example, but not limitation, motion sensor 412 may utilize an accelerometer (e.g., a MEMS device), a gyroscope, a geomagnetic sensor (e.g., a compass), an altimeter (e.g., a barometric pressure altimeter), and/or any other type of movement detection sensor. Moreover, motion sensor 412 may include a plurality of different types of devices and combine their outputs in order to provide motion information.

A processor 410 may be connected to the wide area network wireless transceiver 404, local area network wireless transceiver 406, the SPS receiver 408, and the motion sensor 412. The processor may include one or more microprocessors, microcontrollers, and/or digital signal processors that provide processing functions, as well as other communication and control functionality. The processor 410 may also include memory 414 for storing data and software instructions for executing programmed functionality within the mobile station 400. The memory 414 may be on-board the processor 410 (e.g., within the same IC package), and/or the memory 414 may be external memory to the processor and functionally coupled over a data bus. The details of software functionality associated with aspects of the disclosure will be discussed in more detail below.

A number of software modules and data tables may reside in memory 414 and be utilized by the processor 410 in order to manage both communications, positioning determination, and PCC functionality. As illustrated in FIG. 4, memory 414 may include and/or otherwise receive a positioning module 416, an application module 418, a received signal strength indicator (RSSI) module 420, and a round trip time (RTT) module 422, and a Pairwise Comparison and Compensation (PCC) module 426. One should appreciate that the organization of the memory contents as shown in FIG. 4 is merely exemplary, and as such, the functionality of the modules and/or data structures may be combined, separated, and/or be structured in different ways depending upon the implementation of the mobile station 400.

The application module 418 may be a process running on the processor 410 of the mobile station 400, which requests position information from the positioning module 416. Applications typically run within an upper layer of the software architectures, and may include, for example, Indoor Navigation, Buddy Locator, Shopping and Coupons, Asset Tracking, and location Aware Service Discovery. The positioning module 416 may derive the position of the mobile station 400 using ranging information derived from the RTT and RSSI values, measured from signals exchanged with a plurality of APs. The ranges derived from RTT and RSSI values may be determined in RTT module 422 and RSSI module 420, respectively. In order to accurately determine position using range-based techniques, pairwise measurements between the mobile station 400 and each AP may be generated, and passed to the PCC module 426. Statistics may be generated from the pairwise measurements (such parameters as averages, variances, medians, etc. may be computed) and comparisons made to detect and remove outlier measurements. PCC module 426 may then derive compensation values associated with each wireless channel associated with the mobile station 400/AP pairs. These compensation values, such as RTT and RSSI biases, may then be provided to RTT module 422 and/or RSSI module 420 to improve the estimates of range based on measuring the RSSI and RTT of signals over the wireless channels. These compensation values may also be stored in the parameter database 424 for future use. PCC module 426 may also provide pairwise measurements to other devices upon request, when the paired device on the opposite side of the wireless channel is performing PCC operations to compensate its own range-based positioning. In some operational modes, other devices, as noted above, may include other neighboring mobile stations. Once the improved compensated range estimates are performed in the RTT module 422 and the RSSI module 420, the compensated range values may be passed to the positioning module 416 to determine an improved position of the mobile station 400.

While the modules shown in FIG. 4 are illustrated in the example as being contained in memory 414, it is recognized that in certain implementations such procedures may be provided for or otherwise operatively arranged using other or additional mechanisms. For example, all or part of positioning module 416, PCC module 426, and/or application module 418 may be provided in firmware. Additionally, while in this example positioning module 416 and application module 418 are illustrated as being separate features, it is recognized, for example, that such procedures may be combined together as one procedure or perhaps with other procedures, or otherwise further divided into a plurality of sub-procedures.

Processor 410 may include any form of logic suitable for performing at least the techniques provided herein. For example, processor 410 may be operatively configurable based on instructions in memory 414 to selectively initiate one or more routines that exploit motion data for use in other portions of the mobile device.

The mobile station 400 may include a user interface 450 which provides any suitable interface systems, such as a microphone/speaker 452, keypad 454, and display 456 that allows user interaction with the mobile station 400. The microphone/speaker 452 provides for voice communication services using the wide area network wireless transceiver 404 and/or the local area network wireless transceiver 406. The keypad 454 comprises any suitable buttons for user input. The display 456 comprises any suitable display, such as, for example, a backlit LCD display, and may further include a touch screen display for additional user input modes.

As used herein, mobile station 400 may be any portable or movable device or machine that is configurable to acquire wireless signals transmitted from, and transmit wireless signals to, one or more wireless communication devices or networks. As shown in FIGS. 3 and 4, the mobile station is representative of such a portable wireless device. Thus, by way of example but not limitation, mobile station 400 may include a radio device, a cellular telephone device, a computing device, a personal communication system (PCS) device, or other like movable wireless communication equipped device, appliance, or machine. The term "mobile station" is also intended to include devices which communicate with a personal navigation device (PND), such as by short-range wireless, infrared, wire line connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with any server, such as via the Internet, WiFi, or other network, and regardless of whether satellite signal reception, assistance data reception, and/or position-related processing occurs at the device, at a positioning server, or at another device associated with the network. Any operable combination of the above are also considered a "mobile station." As used herein, the term "wireless device" may refer to any type of wireless communication device which may transfer information over a network and also have position determination and/or navigation functionality. The wireless device may be any cellular mobile terminal, personal communication system (PCS) device, personal navigation device, laptop, personal digital assistant, or any other suitable mobile device capable of receiving and processing network and/or SPS signals.

Figure 5:
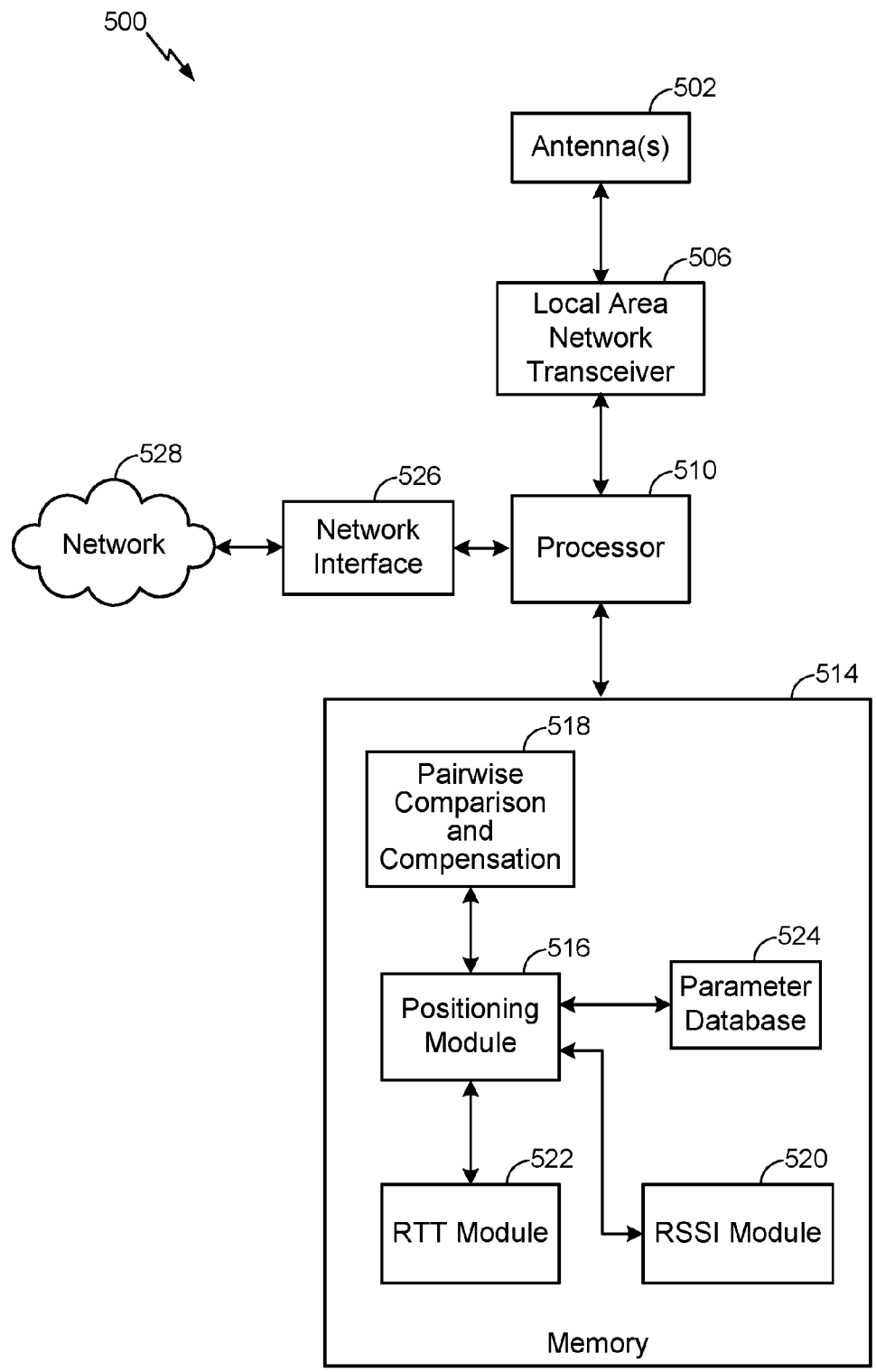
FIG. 5 is a block diagram illustrating various components of an exemplary access point.

FIG. 5 is a block diagram illustrating various components of an exemplary local area network access point (LAN-WAP) 500. The LAN-WAP 500 may include one or more local area network transceiver(s) 506 that may be connected to one or more antennas 502. The local area network transceiver 506 comprises suitable devices, hardware, and/or software for communicating with and/or detecting signals to/from LAN-WAPs 306a-306d, and/or directly with other wireless devices within a network. In one aspect, the local area network transceiver 506 may comprise a WiFi (802.11x) communication system suitable for communicating with the mobile station 400 and/or one or more other local wireless access points; however in other aspects, the local area network transceiver 506 may comprise another type of local area network, or personal area network, (e.g., Bluetooth). Additionally, any other type of wireless networking technologies may be used, for example, Ultra Wide Band, ZigBee, wireless USB etc. The LAN-WAP 500 may further include a wired network interface 526 for communicating with local area network 528, which may further be interconnected with a wide area network via a wired interface.

A processor 510 may be connected to the local area network transceiver 506, and the wired network interface 526. The processor 510 may include one or more microprocessors, microcontrollers, and/or digital signal processors that provide processing functions, as well as other calculation and control functionality. The processor 510 may also include memory 514 for storing data and software instructions for executing programmed functionality within the LAN-WAP 500. The memory 514 may be on-board the processor 510 (e.g., within the same IC package), and/or the memory 514 may be external memory to the processor and functionally coupled over a data bus. The details of software functionality associated with aspects of the disclosure will be discussed in more detail below.

A number of software modules and data tables may reside in memory 514 and be utilized by the processor 510 in order to manage both communications, positioning determination and PCC functionality within LAN-WAP 500. As illustrated in FIG. 5, memory 514 may include and/or otherwise receive a positioning module 516, a received signal strength indicator (RSSI) module 520, and a round trip time (RTT) module 522, and a Pairwise Comparison and Compensation (PCC) module 518. One should appreciate that the organization of the memory contents as shown in FIG. 5 is merely exemplary, and as such the functionality of the modules and/or data structures may be combined, separated, and/or be structured in different ways depending upon the implementation of the LAN-WAP 500.

The positioning module 516 may derive the position of the LAN-WAP 500 and/or the mobile station 301 using ranging information derived from the RTT and RSSI values, as measured from signals exchanged with a plurality of neighboring APs and/or the mobile station 301. The ranges derived from RTT and RSSI values may be determined in RTT module 522 and RSSI module 520, respectively. In order to accurately determine position using range-based techniques, pairwise measurements between the mobile station 301 and each neighboring LAN-WAPs 306a-306d may be generated, and passed to the PCC module 518. Statistics (mean/average, weighted average, variance, median, etc.) may be generated from the pairwise measurements, and comparisons made to detect and remove outlier measurements. PCC module 518 may then derive compensation (adjustment) values associated with each wireless channel associated with the mobile station 301 and LAN-WAPs 306a-306d pairs. These compensation values, such as RTT and RSSI biases, may then be provided to RTT module 522 and/or RSSI module 520 to improve the estimates of range based on measuring the RSSI and RTT of signals over the wireless channels. These compensation values may also be stored in the parameter database 524 for future use. PCC module 518 may also provide pairwise measurements to other devices upon request, when the paired device on the opposite side of the wireless channel is performing PCC operations to compensate its own range-based positioning.

Once the improved compensated range estimates are performed in the RTT module 522 and the RSSI module 520, the compensated range values may be passed to the positioning module 516 to determine an improved position of the mobile station 301.

While the modules shown in FIG. 5 are illustrated in the example as being contained in memory 514, it is recognized that in certain implementations such procedures may be provided for or otherwise operatively arranged using other or additional mechanisms. For example, all or part of positioning module 516, RSSI module 520, RTT module 522, and/or PCC module 518 may be provided in firmware. Additionally, while in this example positioning module 516 and the PCC module 518 are illustrated as being separate features, it is recognized, for example, that such procedures may be combined together as one procedure or perhaps with other procedures, or otherwise further divided into a plurality of sub-procedures.

Processor 510 may include any form of logic suitable for performing at least the techniques provided herein. For example, processor 510 may be operatively configurable based on instructions in memory 514 to selectively initiate one or more routines that exploit motion data for use in other portions of the LAN-WAP 500. As used herein, the LAN-WAP 500 may be any portable or movable device or machine that is configurable to acquire wireless signals transmitted from, and transmit wireless signals to, one or more wireless communication devices or networks.

Figure 6:
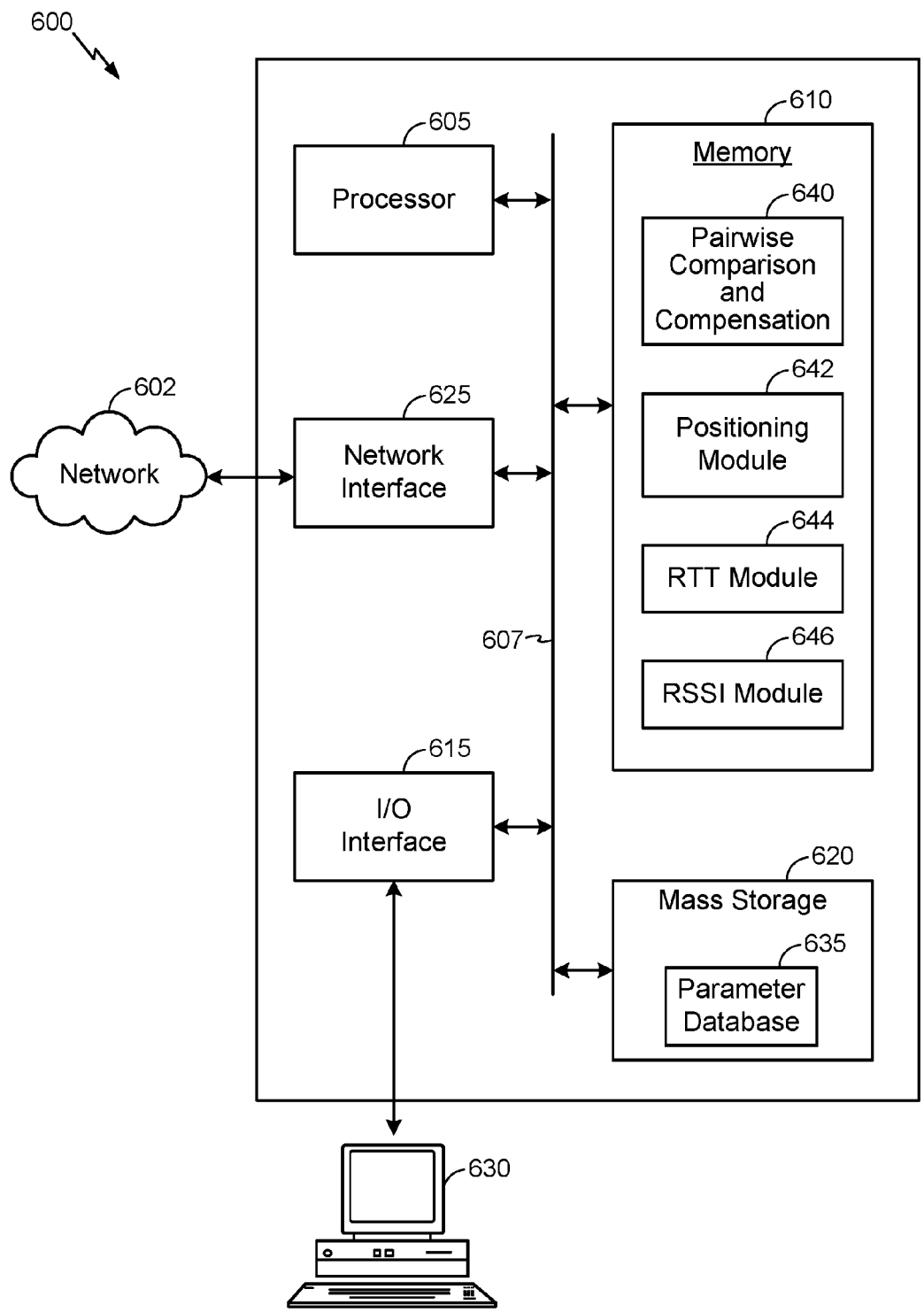
FIG. 6 is a block diagram illustrating various components of an exemplary positioning server.

FIG. 6 is a block diagram illustrating various components of an exemplary positioning server 600. The positioning server 600 may include a processor 605, a system bus 607, a mass storage unit 620, an I/O interface 615, a memory unit 610, and a network interface 625. The processor 605 may interface with memory 610 and the mass storage unit 620 via the system bus 607. The memory 610 and/or the mass storage unit 620 may contain executable instructions in the form of software modules and data in a parameter database for implementing various operations for performing the PCC operations described herein. The network interface 625 may interface with the processor 605 over the system bus 607, and can provide an interface for communication with the network 602. The I/O interface 615 may be provided to permit a user to interface to the positioning server 600 via user interface 630. The positioning server 600 may be any type of computer/server utilizing any suitable operating system. Alternatively, the positioning server 600 may be implemented as special purpose hardware.

The software modules and data tables may reside in memory 610 and/or mass storage 620 can be utilized by the processor 605 in order to manage perform PCC operations and/or positioning determination the wireless network. As illustrated in FIG. 6, memory 610 may include and/or otherwise receive a positioning module 642, a received signal strength indicator (RSSI) module 646, and a round trip time (RTT) module 644, and a Pairwise Comparison and Compensation (PCC) module 640. One should appreciate that the organization of the memory contents as shown in FIG. 6 is merely exemplary, and as such the functionality of the modules and/or data structures may be combined, separated, and/or be structured in different ways depending upon the implementation of the positioning server 600.

The positioning server 600 may receive RSSI and/or RTT measurements from a node of interest for which PCC operations are desired (hereinafter "node"). The node may be a mobile station 301, and/or an AP, such as, for example, a WAN-WAPs 304a-304c and/or LAN-WAPs 306a-306d. The RSSI and/or RTT measurements may be received from the node over network 602. These values may be used to perform PCC operations for the node, and subsequently provide compensation/adjustment values (e.g., RTT and/or RSSI bias values) back to the node over network 602. The positioning server 600 may also determine the position of the node using positioning module 642 using ranging information derived from the RTT and RSSI values received from the node. The ranges may be derived from RTT and RSSI values determined in RTT module 644 and RSSI module 646, respectively.

In order to accurately determine position using range-based techniques, pairwise measurements between the node and the neighboring nodes may be received by the positioning server 600, and passed to the PCC module 640. Statistics may be generated from the pairwise measurements, and comparisons made to detect and remove outlier measurements. PCC module 640 may then derive compensation values associated with each wireless channel associated with the node pairs. These compensation values may then be provided to RTT module 644 and/or RSSI module 646 to improve the estimates of range based on measuring the RSSI and RTT of signals over the wireless channels. These compensation values may also be stored in the parameter database 635 for future use. Once the improved compensated range estimates are performed in the RTT module 644 and the RSSI module 646, the compensated range values may be passed to the positioning module 642 to determine an improved position of the node, which then may be passed back to the node over the network 602.

In summary, the positioning server 600 may perform position determination enhancement by receiving measurements from a first node based on signals received from a plurality of neighboring nodes. The server may further receive signal measurements from a plurality of neighboring nodes based on signals received from the first node. The server may then determine a pairwise comparison of the measurements from the first node and the measurements from each neighboring node, and then compensate the measurements received from the node based on the pairwise comparisons. The server may then provide the compensation parameter(s), such as the bias, to the first node so it may determine position. Alternatively, the positioning server 600 itself may determine a position estimate of the first node using the compensated measurements.

While the modules shown in FIG. 6 are illustrated in the example as being contained in memory 610, it is recognized that in certain implementations such procedures may be provided for or otherwise operatively arranged using other or additional mechanisms. For example, all or part of positioning module 642, RSSI module 646, RTT module 644, and/or PCC module 640 may be provided in firmware. Additionally, while in the example positioning module 642 and the PCC module 640 are illustrated as being separate modules, it is recognized, for example, that such procedures may be combined together as one procedure or perhaps with other procedures, or otherwise further divided into a plurality of sub-procedures.

Figure 7:
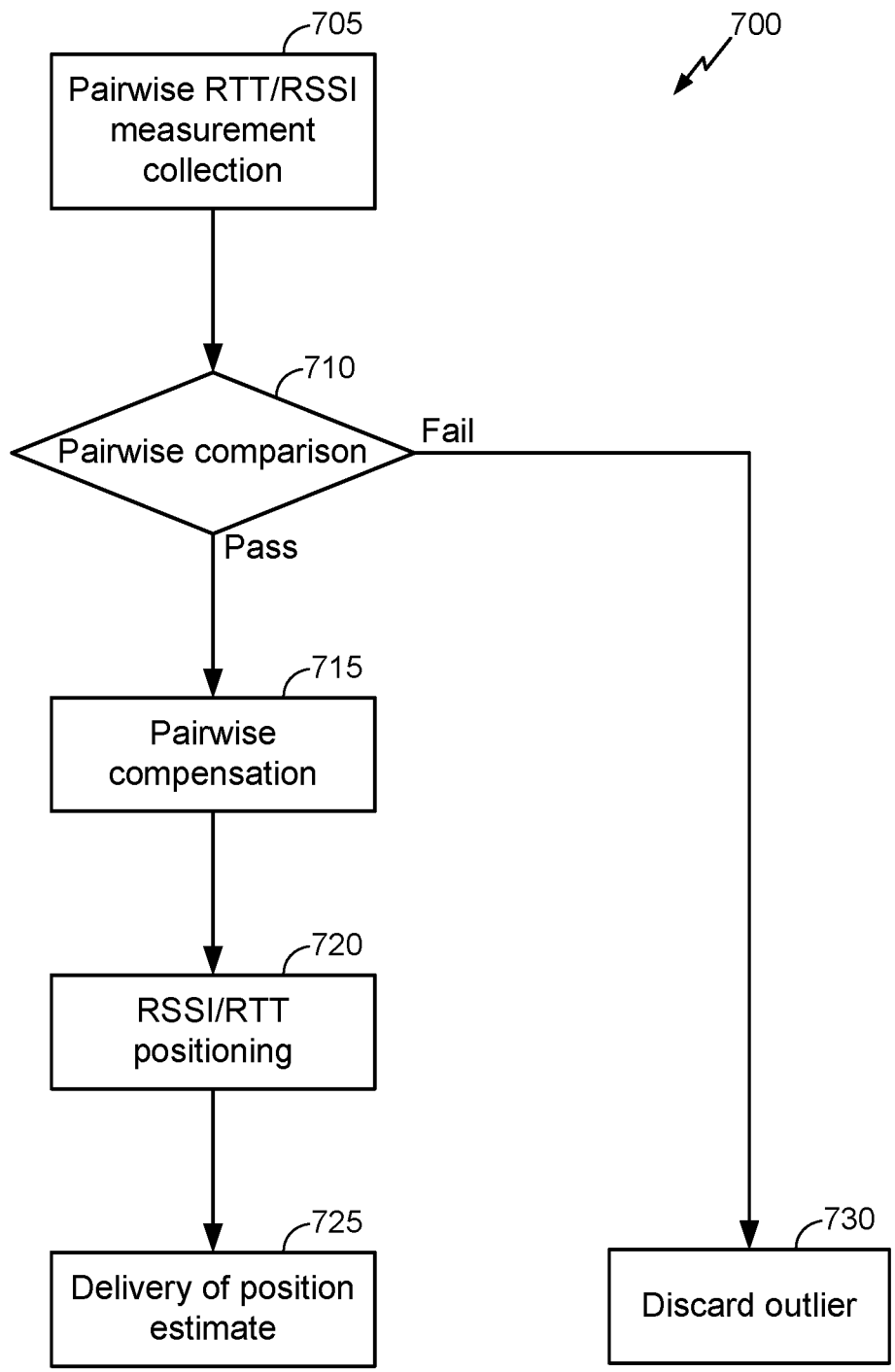
FIG. 7 is a flowchart showing an exemplary process for pairwise comparison and compensation of ranging measurements.

FIG. 7 is a flowchart showing an exemplary process 700 for pairwise comparison and compensation (PCC) of ranging measurements and subsequent position determination of a node of interest. The process may start by performing a collection of pairwise measurements, which may include RTT and/or RSSI values, between pairs of nodes in the wireless network (705). The collection of pairwise measurements may be made between a node of interest (for which an enhanced position measurement may be desired) and a plurality of neighboring nodes. A single pairwise measurement occurs between the node of interest and a neighboring node across a shared wireless channel. The single pairwise measurement produces two measurements representative of the same signal characteristic (e.g., RSSI, RTT, etc.) observed from opposite ends of the shared wireless channel. The shared wireless channel may ideally be the same, and is hereinafter referred to as the "same wireless channel."

In other words, the pairwise measurement may be thought of as the result of measuring a quantity between two nodes over the same wireless channel in opposite directions. For example, the pairwise measurement may be performed by having a node of interest perform one or more measurements using signals received by a neighboring node. The same quantities may be measured in the opposite direction at the neighboring node using signals provided by the node of interest. Once the measurements are completed by the neighboring node, the results may be transmitted back to the node of interest. The pairwise measurements between the aforementioned node pair may be repeated to produce statistically reliable results. Additional pairwise measurements between the node of interest and other neighboring nodes may be performed to generate the collection of pairwise measurements. The process 700 may be performed between any types of nodes in the wireless network (e.g., the mobile station 301, the LAN-WAPs 306*a*-306*d* and/or the WAN-WAPs 304*a*-304*c*). These pairwise measurements may be shared between nodes for processing, and/or sent to the positioning server 600 for PCC and/or position determination.

Next, a pairwise comparison step may be performed on the pairwise measurements to detect and remove outliers (710). This may include determining differences between each measurement pair, and computing statistics of the measurement pair (such as a mean, average, median, variance, standard deviation, etc.), which may be combined to calculate an overall uncertainty parameter per wireless channel. The uncertainty parameter may be used determine a test as to whether outliers are present in the pairwise measurements, which may utilize a predetermined threshold and/or a calculated threshold which is adjusted as more measurements are determined. Either type of threshold is referred to herein as a measurement error threshold, and may be an RTT threshold and/or an RSSI threshold. When an outlier is detected, (i.e., the measurement fails a quality test), the outlier measurement may be discarded (730). Discarding the outliers may improve the quality of the pairwise measurements, and thus increase the accuracy of the subsequent range and position determination operations.

Pairwise measurements which have passed the quality test and are not discarded will be used to determine pairwise compensation values (715). Here, paired measurements which passed the comparison block (710) may be used to compute compensation estimates, such as RTT bias estimates and/or RSSI bias estimates. Once these compensation values are determined, they may be applied to the pairwise measurements. In an embodiment, the pairwise RSSI measurements may be adjusted to have the computed RSSI bias removed, and the pairwise RTT measurements may be adjusted to have the RTT bias removed for each wireless channel associated with the node of interest. These compensated pairwise measurements may be further processed statistically, and/or weighted based on the channel uncertainty computed in block (710). The processed/weighted measurements determined in block (715) may then be used to determine corresponding ranges, and then an enhanced position estimate of the node using range-based position determination (720). The enhanced position estimate may be delivered to a requesting entity (725), such as an application (e.g., a navigation app) running on the mobile station 301.

Figure 8:
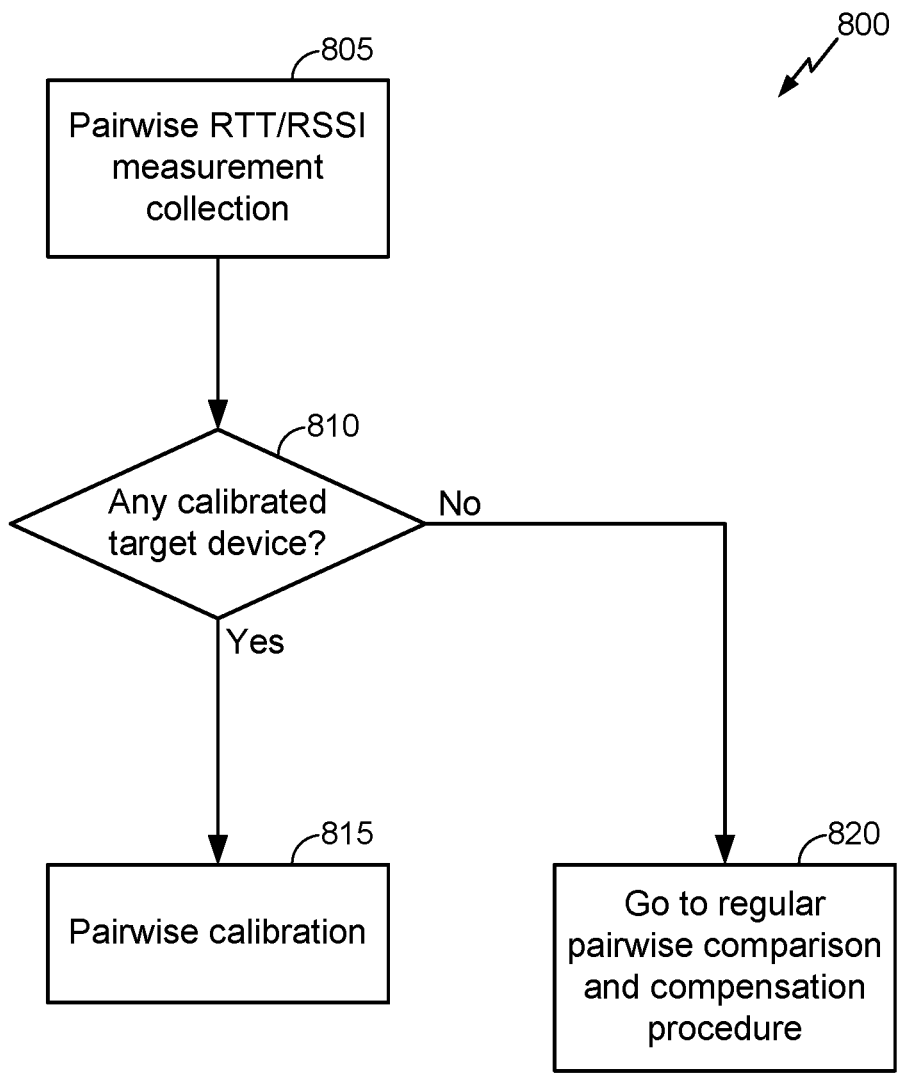
FIG. 8 is a flowchart showing an exemplary process for pairwise calibration when a neighboring node is pre-calibrated.

FIG. 8 is a flowchart showing an exemplary process 800 for pairwise calibration when a neighboring node is pre-calibrated. This process permits the calibration accuracy of the pre-calibrated device to be "propagated" to other nodes within the network. Moreover, process 800 may be performed within any node in the wireless network (e.g., the mobile station 301, the LAN-WAPs 306a-306d and/or the WAN-WAPs 304a-304c). Initially, the method may start out similarly as block 705 in FIG. 7 as described above, where pairwise measurement collection is performed (e.g., RTT and/or RSSI measurements) from available neighboring devices (805). These pairwise measurements may be shared between nodes, or sent to the positioning server 600. Each pair of devices may generate multiple pairwise measurements over a common wireless channel.

Next, the node may determine if any neighboring node is a calibrated target device (810). This may be performed by having the neighboring node provide a reliability indicator directly to the node, or indirectly through a parameter via the positioning server 310. If there are no target calibrated devices available, the process will perform the PCC process 700 shown in FIG. 7 (820). However, if a target calibration device exists, pairwise calibration may be performed based on the calibrated device (815). This may be performed by calculating statistics of the pairwise RSSI measurements (e.g., perform an average or mean of the RSSI values). Pairwise differences of RSSI and RTT may then be determined. The bias estimate for the RSSI values may be determined by calculating the mean of the pairwise RSSI differences. The bias estimate for the RTT values may be determined by calculating the mean of the pairwise RTT differences. The estimated bias values may be stored in the parameter database of the node, or in the parameter database of the positioning sever 310, for use in future pairwise calibration with other nodes. In alternative embodiments, a confidence level of the calibration information associated with a calibrated device may be determined. This confidence level may be based on evaluating the statistics of the pairwise measurements described above in relation to the calibration information of the calibrated device for one or more nodes. A weighting value for the bias values may be determined/adjusted based upon the confidence level.

Figure 9:
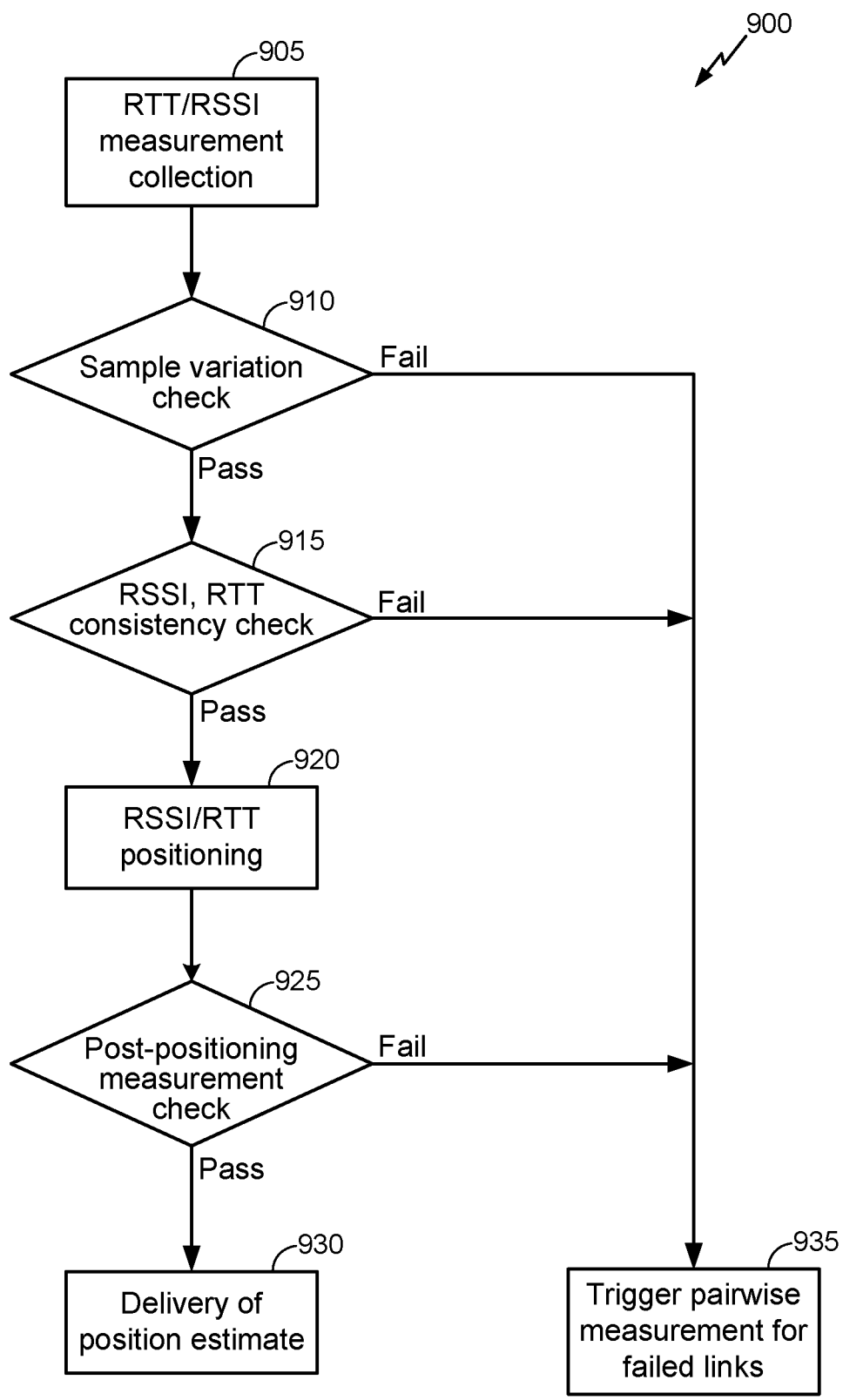
FIG. 9 is a flowchart showing an exemplary process triggering pairwise comparison and compensation.

FIG. 9 is a flowchart showing an exemplary process 900 for triggering pairwise comparison and compensation. This process may monitor RSSI and RTT values over time, and perform PCC to reduce their variance if they drift too much as time progresses. The use of triggering alleviates a node from having to perform ongoing PCC as the node operates in the network.

Initially, the process 900 may start out similarly as block 705 in FIG. 7 as described above, where pairwise measurement collection is performed (e.g., RTT and/or RSSI measurements) from available neighboring devices (905). These pairwise measurements may be shared between nodes, or sent to the positioning server 600. Each pair of devices may generate multiple pairwise measurements over a common wireless channel.

A sample variation check may then be performed (910). This sample variation may be determined by computing the statistics of the RSSI measurements determined at the node of interest. A failure may be declared if the mean RSSI is lower than an RSSI threshold. When a failure is declared, the PCC process 700 is triggered for the wireless channel associated with failed RSSI measurement (935). Various statistical measurements, such as variance calculation, ANOVA, etc., may be performed to assess the variation of the measurements in block 910.

If the RSSI measurement passes the sample variation check in block 910, a consistency check between the RSSI and the RTT values may be performed (915). Here, the ranges between the node and a neighboring node may be determined based on the RTT values. This range may be converted to an expected RSSI value using known models. If the difference between the expected RSSI and the measured RSSI is higher than a threshold (e.g., referred to herein as an "RSSI-range threshold"), then a failure may be declared. Similar checks may be made on the RTT values using an RTT-range threshold. When a failure is declared, the PCC process 700 is triggered for the failed wireless channel (935). In summary, the consistency check between RTT and RSSI values may include determining a range corresponding to an RTT measurement associated with a given neighboring node; determining an expected RSSI value based on the determined range; comparing, based on an RSSI threshold, the expected RSSI value with the RSSI measurement associated with the given neighboring node; and indicating that the RSSI measurement is inconsistent with the RTT measurement when the comparison exceeds the RSSI threshold.

Summarizing blocks 910 and 915, process 900 may evaluate the quality of the RTT and RSSI measurements received from the neighboring nodes. When the pairwise RTT and/or RSSI measurements fail the evaluation, PCC may be triggered with each neighboring node associated with the measurements which fail the evaluation.

If the RSSI and RTT values for the node of interest pass the evaluation tests in block 910 and block 915, range based positioning of the node may be performed using the checked RSSI and RTT values to determine the ranges (920). A post positioning measurement check may then be performed (925). Here, the ranges to each neighboring node may be computed geometrically using the position determined in block 920 and the known positions of the neighboring nodes. If the difference between the geometric range and the range determined using the RTT exceeds a threshold (e.g., an RTT-range threshold) for given wireless channel, the range value fails, and the PCC process 700 is triggered for the failed wireless channel (935). Thus, process 900 may compare information based on the measurements with information derived from the determined position estimate, and performing pairwise comparison and compensation with each neighboring node associated with RTT measurements and/or RSSI measurements (where the RSSI ranges may be compared against an RSSI-range threshold) which compare unfavorably (i.e., fails to pass the threshold test). However, if the measurements for the node pass the post-positioning measurement check in block 925, and thus favorably compare, the position of the node of interest is validated, and may then be delivered to the requested application (930).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for triggering an enhanced position estimate of a first node using pairwise measurements, comprising:
   receiving a plurality of pairwise measurements between a first node and a plurality of corresponding neighboring nodes, wherein each pairwise measurement includes at least:
      a first Round Trip Time (RTT) from one neighboring node of the plurality of neighboring nodes to the first node and back, and a second RTT from the first node to the one neighboring node and back; or
      a first Received Signal Strength Indicator (RSSI) measurement measured at the first node using a signal provided by the one neighboring node, and a second RSSI measurement measured at the one neighboring node using a signal provided by the first node;
   evaluating a quality of the each pairwise measurement;
   determining a position estimate of the first node based on pairwise measurements which pass the evaluating; and
   determining a pairwise compensation value for each neighboring node associated with pairwise measurements which fail the evaluating.

2. The method of claim 1, wherein the evaluating the quality of each pairwise measurement comprises:
   calculating variations of the RTT or RSSI measurements for a given neighboring node;
   determining whether variations in the RTT measurements are within an RTT threshold for RTT measurements; and
   determining whether variations in the RSSI measurements are within an RSSI threshold for RSSI measurements.

3. The method of claim 1, wherein each pairwise measurement includes both RTT and RSSI measurements and wherein the evaluating the quality of each pairwise measurement comprises determining whether the RTT measurements are consistent with the RSSI measurements.

4. The method of claim 3, wherein determining whether the RTT measurements are consistent with the RSSI measurements comprises:
   determining a range corresponding to an RTT measurement associated with a given neighboring node;
   determining an expected RSSI value based on the range;
   comparing the expected RSSI value with the RSSI measurement associated with the given neighboring node; and
   indicating that the RSSI measurement associated with the given neighboring node fails the evaluating if the difference between the expected RSSI value and the RSSI measurement exceeds an RSSI threshold.

5. The method of claim 1, further comprising:
   comparing information based on the pairwise measurements which pass the evaluating with information derived from the position estimate; and
   determining a pairwise compensation value for each neighboring node associated with pairwise measurements which fail the comparing.

6. The method of claim 5, wherein:
   the comparing the information based on the pairwise measurements which pass the evaluating with the information derived from the position estimate comprises:
      calculating a first range to a given neighboring node having a known position using the position estimate of the first node; and
      determining a second range to the given neighboring node based on the RTT measurement associated with the given neighboring node; and
   the determining the pairwise compensation value for each neighboring node associated with the pairwise measurements which fail the comparing comprises:
      determining the compensation value for the given neighboring node based, at least in part, on the first range and the second range.

7. The method of claim 5, wherein:
   the comparing the information based on the pairwise measurements which pass the evaluating with the information derived from the position estimate comprises:
      calculating a first range to a given neighboring node having a known position using the position estimate of the first node; and
      determining a second range to the given neighboring node based on the RSSI measurement associated with the given node; and
   the determining the pairwise compensation value for each neighboring node associated with the pairwise measurements which fail the comparing comprises:
      determining the compensation value for the given neighboring node based, at least in part, on the first range and the second range.

8. A first node which triggers an enhanced position estimate using pairwise measurements, comprising:
   a wireless transceiver;
   a processor coupled to the wireless transceiver; and
   a memory coupled to the processor, wherein the memory stores executable instructions and data for causing the processor to:
   receive a plurality of pairwise measurements between a first node and a plurality of neighboring nodes, wherein each pairwise measurement from one neighboring node of the plurality of neighboring nodes to the first node and back, and a second RTT from the first node to the one neighboring node and back; or
      a first Received Signal Strength Indicator (RSSI) measurement measured at the first node using a signal provided by the one neighboring node, and a second RSSI measurement measured at the one neighboring node using a signal provided by the first node;

evaluate a quality of the each pairwise measurement;
determine a position estimate of the first node based on pairwise measurements which pass the evaluating; and
determine a pairwise compensation value for each neighboring node associated with pairwise measurements which fail the evaluating.

9. The first node of claim 8, wherein to evaluate the quality of each pairwise measurement, the memory further stores executable instruction and data for causing the processor to:
calculate variations of the RTT or RSSI measurements for a given neighboring node;
determine whether variations in the RTT measurements are within an RTT threshold for RTT measurements; and
determine determining whether variations in the RSSI measurements are within an RSSI threshold for RSSI measurements.

10. The first node of claim 8, wherein each pairwise measurement includes both RTT and RSSI measurements and wherein to evaluate the quality of each pairwise measurement, the memory further stores executable instruction and data for causing the processor to determine whether the RTT measurements are consistent with the RSSI measurements.

11. The first node of claim 10, wherein to determine whether the RTT measurements are consistent with the RSSI measurements, the memory further stores executable instruction and data for causing the processor to:
determine a range corresponding to an RTT measurement associated with a given neighboring node;
determine an expected RSSI value based on the range;
compare the expected RSSI value with the RSSI measurement associated with the given neighboring node; and
indicate that the RSSI measurement associated with the given neighboring node fails the evaluating if the difference between the expected RSSI value and the RSSI measurement exceeds an RSSI threshold.

12. The first node of claim 8, wherein the memory further stores executable instruction and data for causing the processor to:
compare information based on the pairwise measurements which pass the evaluating with information derived from the position estimate; and
determine a pairwise compensation value for each neighboring node associated with pairwise measurements which fail the comparing.

13. The first node of claim 12, wherein:
to compare the information based on the pairwise measurements which pass the evaluating with the information derived from the position estimate, the memory further stores executable instruction and data for causing the processor to:
calculate a first range to a given neighboring node having a known position using the position estimate of the first node; and
determine a second range to the given neighboring node based on the RTT measurement associated with the given neighboring node; and
to determine the pairwise compensation value for each neighboring node associated with the pairwise measurements which fail the comparing, the memory further stores executable instruction and data for causing the processor to:
determine the compensation value for the given neighboring node based, at least in part, on the first range and the second range.

14. The first node of claim 12, wherein:
to compare the information based on the pairwise measurements which pass the evaluating with the information derived from the position estimate, the memory further stores executable instruction and data for causing the processor to:
calculate a first range to a given neighboring node having a known position using the position estimate of the first node; and
determine a second range to the given neighboring node based on the RSSI measurement associated with the given node; and
to determine the pairwise compensation value for each neighboring node associated with the pairwise measurements which fail the comparing, the memory further stores executable instruction and data for causing the processor to:
determine the compensation value for the given neighboring node based, at least in part, on the first range and the second range.

15. An apparatus for triggering an enhanced position estimate using pairwise measurements, comprising:
means for receiving a plurality of pairwise measurements between a first node and a plurality of neighboring nodes, wherein each pairwise measurement includes at least:
a first Round Trip Time (RTT) from one neighboring node of the plurality of neighboring nodes to the first node and back, and a second RTT from the first node to the one neighboring node and back; or
a first Received Signal Strength Indicator (RSSI) measurement measured at the first node using a signal provided by the one neighboring node, and a second RSSI measurement measured at the one neighboring node using a signal provided by the first node;
means for evaluating a quality of the each pairwise measurement;
means for determining a position estimate of the first node based on pairwise measurements which pass the evaluating; and
means for determining a pairwise compensation value for each neighboring node associated with pairwise measurements which fail the evaluating.

16. The apparatus of claim 15, wherein means for evaluating the quality of each pairwise measurement comprises:
means for calculating variations of the RTT or RSSI measurements for a given neighboring node;
means for determining whether variations in the RTT measurements are within an RTT threshold for RTT measurements; and
means for determining whether variations in the RSSI measurements are within an RSSI threshold for RSSI measurements.

17. The apparatus of claim 15, wherein each pairwise measurement includes both RTT and RSSI measurements and wherein means for evaluating the quality of each pairwise measurement comprises means for determining whether the RTT measurements are consistent with the RSSI measurements.

18. The apparatus of claim 17, wherein means for determining whether the RTT measurements are consistent with the RSSI measurements comprises:

means for determining a range corresponding to an RTT measurement associated with a given neighboring node;
means for determining an expected RSSI value based on the range;
means for comparing the expected RSSI value with the RSSI measurement associated with the given neighboring node; and
means for indicating that the RSSI measurement associated with the given neighboring node fails the evaluating if the difference between the expected RSSI value and the RSSI measurement exceeds an RSSI threshold.

19. The apparatus of claim 15, further comprising:
means for comparing information based on the pairwise measurements which pass the evaluating with information derived from the position estimate; and
means for determining a pairwise compensation value for each neighboring node associated with pairwise measurements which fail the comparing.

20. The apparatus of claim 19, wherein:
means for comparing the information based on the pairwise measurements which pass the evaluating with the information derived from the position estimate comprises:
means for calculating a first range to a given neighboring node having a known position using the position estimate of the first node; and
means for determining a second range to the given neighboring node based on the RTT measurement associated with the given neighboring node; and
means for determining the pairwise compensation value for each neighboring node associated with the pairwise measurements which fail the comparing comprises:
means for determining the compensation value for the given neighboring node based, at least in part, on the first range and the second range.

21. The apparatus of claim 19, wherein:
means for comparing the information based on the pairwise measurements which pass the evaluating with the information derived from the position estimate comprises:
means for calculating a first range to a given neighboring node having a known position using the position estimate of the first node; and
means for determining a second range to the given neighboring node based on the RSSI measurement associated with the given node; and
means for determining the pairwise compensation value for each neighboring node associated with the pairwise measurements which fail the comparing comprises:
means for determining the compensation value for the given neighboring node based, at least in part, on the first range and the second range.

22. A non-transitory computer-readable medium comprising instructions, which, when executed by a processor, cause the computer to perform operations, the instructions comprising:
code for receiving a plurality of pairwise measurements between a first node and a plurality of neighboring nodes, wherein each pairwise measurement includes at least:
a first Round Trip Time (RTT) from one neighboring node of the plurality of neighboring nodes to the first node and back, and a second RTT from the first node to the one neighboring node and back; or
a first Received Signal Strength Indicator (RSSI) measurement measured at the first node using a signal provided by the one neighboring node, and a second RSSI measurement measured at the one neighboring node using a signal provided by the first node;
code for evaluating a quality of the each pairwise measurement;
code for determining a position estimate of the first node based on pairwise measurements which pass the evaluating; and
code for determining a pairwise compensation value for each neighboring node associated with pairwise measurements which fail the evaluating.

23. The non-transitory computer-readable medium of claim 22, wherein the code for evaluating the quality of each pairwise measurement comprises:
code for calculating variations of the RTT or RSSI measurements for a given neighboring node;
code for determining whether variations in the RTT measurements are within an RTT threshold for RTT measurements; and
code for determining whether variations in the RSSI measurements are within an RSSI threshold for RSSI measurements.

24. The non-transitory computer-readable medium of claim 22, wherein each pairwise measurement includes both RTT and RSSI measurements and wherein the code for evaluating the quality of each pairwise measurement comprises code for determining whether the RTT measurements are consistent with the RSSI measurements.

25. The non-transitory computer-readable medium of claim 24, wherein the code for determining whether the RTT measurements are consistent with the RSSI measurements comprises:
code for determining a range corresponding to an RTT measurement associated with a given neighboring node;
code for determining an expected RSSI value based on the range;
code for comparing the expected RSSI value with the RSSI measurement associated with the given neighboring node; and
code for indicating that the RSSI measurement associated with the given neighboring node fails the evaluating if the difference between the expected RSSI value and the RSSI measurement exceeds an RSSI threshold.

26. The non-transitory computer-readable medium of claim 22, further comprising:
code for comparing information based on the pairwise measurements which pass the evaluating with information derived from the position estimate; and
code for determining a pairwise compensation value for each neighboring node associated with pairwise measurements which fail the comparing.

27. The non-transitory computer-readable medium of claim 26, wherein:
the code for comparing the information based on the pairwise measurements which pass the evaluating with the information derived from the position estimate comprises:
code for calculating a first range to a given neighboring node having a known position using the position estimate of the first node; and
code for determining a second range to the given neighboring node based on the RTT measurement associated with the given neighboring node; and
the code for determining the pairwise compensation value for each neighboring node associated with the pairwise measurements which fail the comparing comprises:

code for determining the compensation value for the given neighboring node based, at least in part, on the first range and the second range.

28. The non-transitory computer-readable medium of claim 26, wherein:
the code for comparing the information based on the pairwise measurements which pass the evaluating with the information derived from the position estimate comprises:
code for calculating a first range to a given neighboring node having a known position using the position estimate of the first node; and
code for determining a second range to the given neighboring node based on the RSSI measurement associated with the given node; and
the code for determining the pairwise compensation value for each neighboring node associated with the pairwise measurements which fail the comparing comprises:
code for determining the compensation value for the given neighboring node based, at least in part, on the first range and the second range.

* * * * *